United States Patent Office 3,273,198
Patented Sept. 20, 1966

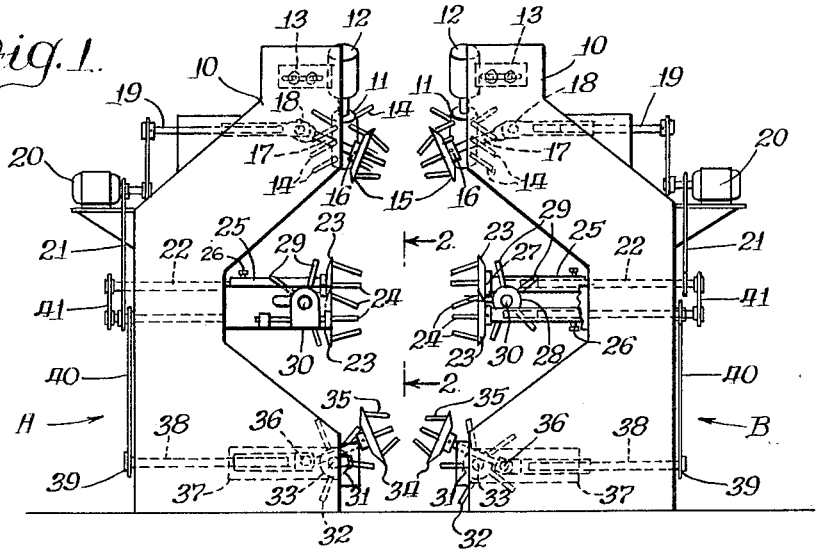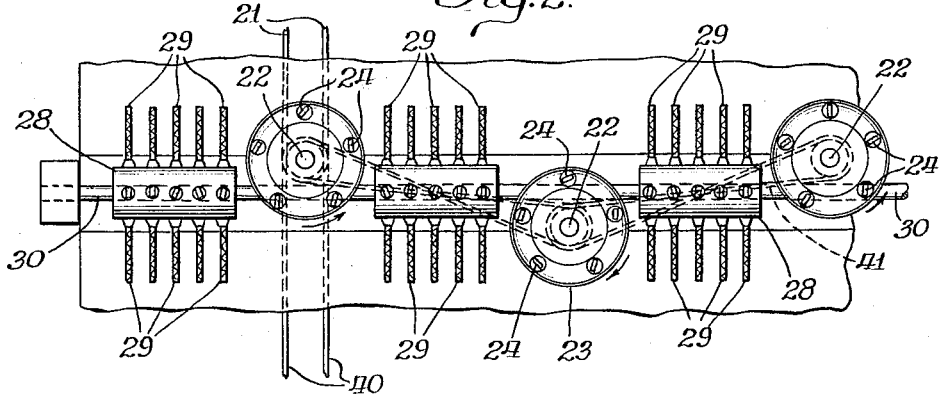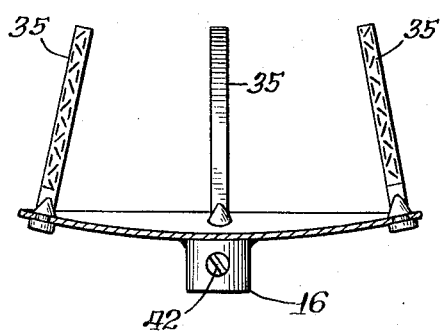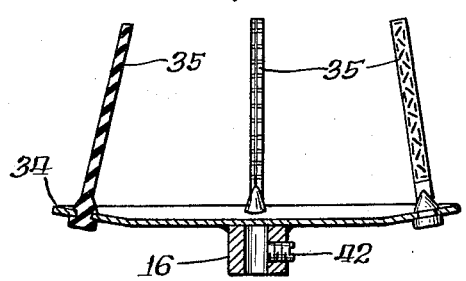

3,273,198
APPARATUS FOR REMOVING FEATHERS
FROM POULTRY
Kent Tomlinson, 13145 Coronado Drive,
North Miami, Fla.
Filed May 28, 1964, Ser. No. 370,813
14 Claims. (Cl. 17—11.1)

This invention relates to an improved type of feather-picking machine with specially designed discs or saucers for holding rubber fingers, which discs or saucers are adjustable so that their rubber fingers can be made to cover all sections of the carcass from which feathers need to be removed.

The use of discs with fingers extending therefrom at right angles has been known and practiced for years. The use of drums with rubber fingers extending radially therefrom to remove feathers from the hocks and carcass of poultry is likewise old. Barker in his patent, No. 2,389,404 shows the use of rolling wheel drums at the bottom of his feather-picking machine which support some of the weight of the passing carcasses.

A special feature of the feather-picking machine covered herein is a combination of several arrangements of fingers so as to effectively remove all the feathers from the poultry. A special combination might include counter rotated horizontal drums with fingers extending radially from the drum surface, together with oppositely-disposed rotary discs with fingers extending at right angles therefrom, and said rotary disc elements alternating with sections of said horizontal drums throughout the length of said feather-picking machines.

Another combination of feather-picking might include in addition to the above described counter-rotated horizontal drums and oppositely-disposed rotary discs a series of vertical drums with fingers extending radially from the drum surface and an alternate series of angularly-disposed rotary discs with fingers extending at right angles therefrom. Said combination being very effective in removing feathers from the carcass of the poultry and the hocks and lower legs of the fowl.

Still another combination would include the above second combination plus a third series of horizontal drums with fingers extending radially from the drum surface, which drums are lower in the machine, and an alternate series of angularly-disposed rotary discs with fingers extending at right angles therefrom, said combination being very effective in removing feathers from the wing and lower neck sections of the carcass and from the upper neck and head of the fowl. It should be understood that in the foregoing descriptions of combinations covered hereby the fowl normally is suspended by its feet in a shackle and hangs with its head down and free as it passes along on an overhead conveyor and through the feather-picking machine.

In all cases where rotary discs are used in any of the foregoing combinations I recommend the use of discs shaped like a saucer or a pie pan with rubber or rubber-like fingers extending at right angles to the upper edges of said saucers or pans so that the fingers converge although they are always to be short enough so as not to meet and at the same time be less resilient than longer fingers. I have found rubber-like fingers about six inches long when mounted at right angles to discs shaped like a saucer or pie pan are very effective in removing feathers from poultry.

It is an object of this invention to control the stiffness of the spinning fingers by changing the angle at which they spin and also using shorter fingers.

A special feature of the several combinations of feather-picking members described aforesaid is the provision of directing the rotary discs as shown in the accompanying drawing horizontally against the main body of the passing poultry, or tilting the discs upwards at an angle from a lower lever of the machine so as to clean the neck and wing areas of the poultry, or tilting the discs down at an angle from the upper level of the machine so as to clean the feathers off the legs, hocks and bottom of the poultry.

The several features and advantages of the feather-picking machine of this invention will be apparent from the following description in connection with the accompanying drawings of a preferred embodiment.

FIGURE 1 is a side elevation of my feather-picking machine employing both horizontal and vertical rotary drums with feather-picking fingers extending radially from said drum surfaces, and also discs shaped like a saucer or pie pan fastened to rotatable hobs which have fingers extending at right angles to the outer edges of said discs.

FIGURE 2 is an enlarged fragmentary vertical sectional view of the feather-picking means at the middle level taken along line 2—2 of FIGURE 1 and shows the alternate arrangement of the horizontal drum means and rotary disc means for feather picking and the manner in which said rotary discs may be counter rotated.

FIGURE 3 is an enlarged, sectional view of a disc shaped like a pie pan with feather-picking fingers extending at right angles to the inclined outer edges of said pie-pan disc.

FIGURE 4 is an enlarged, sectional view of a disc of my invention shaped like a saucer with feather-picking fingers extending at right angles to the outer edges of said disc which are inclined upwards to affect the saucer-like shape.

In a preferred embodiment of the machine and apparatus of my invention there is shown in FIGURE 1 a side elevation of a machine using adjustable vertical and horizontal drums with feather-picking fingers extending radially from said drums, and adjustable discs of pie-pan shape with feather-picking fingers extending at right angles to the inclined outer edges of said discs. Three levels of feather-picking means are shown in which the rotary disc means are alternated in series with generally horizontal rotatable drum means in the lower and central levels, while the rotary disc means are alternated with generally vertical rotatable drum means in the upper level. The poultry is usually suspended by a shackle from an overhead traveller by attaching one or both feet of the fowl to the shackle and then passing the fowl hanging with head down through the defeathering machine. Depending on the size of the poultry the vertical and horizontal drums of the machine can be moved closer together or farther apart to obtain the best cleaning effect. Likewise the rotary discs can be moved in or out, or directed up at an angle, or down at an angle, in order to obtain the best contact with the passing poultry. However, because of the alternate spacing of drums and discs they cannot be moved closer together or farther apart in a horizontal direction lengthwise within the machine at any of the three levels of feather picking.

In FIGURE 1 the left-hand side of the machine of this invention is generally identified as A and the right-hand side as B. They are identical though opposite, and may be joined or stand independently because of their great weight. The combined halves A and B are identified generally by numeral 10. At the upper level of 10 are shown identical series of generally vertical drums 11 operated by motors 12. These motors and direct connected drums are adjustable in and out by means 13 shown but being conventional not described here. Drums 11 have multiple parallel series of rubber-like fingers 14 extending as shown in drawing from top to bottom of each drum.

The drums may be rotated in the same direction or in opposite directions as necessity dictates.

Discs 15 shaped like a pie pan are connected by conventional means 16 to shaft 17 and through universal joints 18 to drive shafts 19. Electric motors 20 or other suitable means provide power to rotate discs 15 in either the same direction or in opposite direction as the defeathering operation may require.

Motors 20 are connected by pulleys 21 to operate drive shafts 22 located at the middle level of the machine. A series of rotating discs 23 are located generally parallel to the vertical center line through the machine although the individual fingers 24 converge on the main body or carcass of the fowl not shown. The rotary discs 23 can be moved closer to or farther back from the carcass of the fowl by adjusting the sleeves 25 along the shafts 22 and fastening them together by clamp screws 26. The discs 23 are fastened to sleeves 25 by conventional means such as set screws 27 (FIG. 1) or the like.

It is within the scope of this invention that the rotary discs at the central level of the machine might preferably focus on the carcass of the fowl at a slight angle for better defeathering in which case a drive shaft 19 having a universal joint connection 18 as previously described could replace the shaft 22 and sleeve 25.

The series of horizontal drums with radially-extending fingers are represented by drum 28 and fingers 29 at the middle level of machine 10. These drums are mounted on a single shaft 30 running lengthwise through the machine to connect to a means not shown for rotating said shaft 30 and multiple drums 29 in either a clockwise or counterclockwise direction. As illustrated in FIG. 1, the shaft 30 can be adjusted in a generally horizontal direction in any well known manner as by mounting the shaft in a bearing carried by a slot and controlled by a lead screw to move the shaft 30 in each of sections A and B of the machine 10 closer together or farther apart depending on the average size of the poultry being defeathered.

At the lower level of machine 10 identical construction is shown in both sections A and B of machine 10. A series of horizontal drums 31 with radially-extending fingers 32 are mounted lengthwise along shaft 33. The shafts 33 can be moved closer together or further separated as the circumstances require for defeathering the poultry at that level in a manner similar to that described for the middle level. Likewise the pie-pan shaped discs 34 with fingers 35 may be adjusted through universal joints 36 to tilt upwards so as to effectively defeather the wing and neck sections of the passing poultry. The means for adjusting the horizontal drums 28 would be at the rear end of sections A and B and are indicated by dotted lines 37 and because the means would be conventional are not described herein. Pulley means for rotating shafts 38 are shown at 39 connected by belts 40 to motor 20. Crossed belting to rotate discs alternately in opposite directions are indicated at 41.

In FIGURE 2 an enlarged view of the defeathering means at the middle level of machine 10 is shown. It also shows the alternate arrangement of the horizontal drums with the rotatable discs described herein. It also shows a feature not previously described herein of the rotary discs being alternately higher and lower in its own series arrangement so as to be sure of scraping all sections of the main carcass of the fowl. In one machine the inventor built, he installed six rotary discs above the level of the shafts for the horizontal drums and five rotary discs below said shafts. That gives some idea of the size of a feather-picking machine of this invention because there were 11 rotary discs with fingers scraping the carcasses of the passing fowl and alternately 12 drums with fingers "beating" the same carcasses in turn as the fowl passed through the machine.

FIGURE 3 is an enlarged view of a rotary disc shaped like a pie pan with fingers extending at right angles from the inclined edge so as to converge slightly. The disc is connected by collar means 16 and fastened by set screw 42 to a drive shaft 25, like at the middle level of the machine 10, or to the shaft of a universal joint 18 or 36, like at the upper and lower levels of said machine. The feather-picking fingers used on the rotary discs are shorter and less resilient than the fingers on the rotatable drums of the machine. The shorter length and converging location of the rubber fingers results in a better scrubbing action on the carcass of the poultry because the fingers are less liable to bend.

FIGURE 4 is an enlarged view of a rotary disc covered by this invention shaped like a saucer with fingers extending at right angles from the outer areas of the saucer so as to converge, like those on the pie-pan shaped discs, on the carcass of the fowl. The rubber-like fingers on this saucer-shaped disc are likewise shorter than the normal feather-picking fingers. The inventor reports excellent cleaning off of feathers with fingers about six inches long and designed according to his U.S. Patent 3,108,317. Although it was inventor's object to control the stiffness of the spinning fingers by shortening his own patented fingers it is within the scope of this invention to use any of the commercial short feather-picking fingers that will bend a minimum amount when spinning over the carcass of the poultry.

What I claim as invention:

1. A machine for removing feathers from poultry consisting of two oppositely-disposed metal frames having the same construction and parts, said frames facing each other but separated enough to allow a fowl suspended by its legs to hang head down and pass between said frames, each frame containing a series of horizontal drums with rubber-like fingers extending radially from the surfaces of said drums, and a series of rotating discs alternately intervening between said horizontal drums with rubber-like fingers extending perpendicularly from said discs, and said horizontal drums being parallel to the passage of the suspended fowl, while said rotary discs face towards the same passage and are alternately above and below the center lines of said horizontal drums.

2. A machine for removing feathers from poultry consisting of two oppositely-disposed metal frames having the same construction and parts, said frames facing each other but separated enough to allow a fowl suspended by its legs to hang head down and pass between said frames, each frame containing a series of horizontal drums along a line midway between the top and bottom of said frame, and having rubber-like fingers extending radially from the surfaces of said drums, and a series of rotating discs alternately intervening between said horizontal drums with rubber-like fingers extending perpendicularly from said discs, said horizontal drums lying parallel to the passage of the suspended fowl, while said rotary discs face towards the same passage but are alternately above and below the center lines of said horizontal drums, and a similar series of horizontal drums with a similar series of rotating discs alternately intervening between said horizontal drums at lower levels than said previously described horizontal drums and rotating discs but with said lower rotating discs angled upward so as to remove feathers from neck and wings of passing fowl.

3. A machine for removing feathers from poultry consisting of two oppositely-disposed metal frames having the same construction and parts, said frames facing each other but separated enough to allow a fowl suspended by its legs to hang head down and pass between said frames, each frame containing a series of horizontal drums midway between the top and bottom of said frame with rubber-like fingers extending radially from the surfaces of said drums, and a series of rotating discs alternately intervening between said horizontal drums with rubber-like fingers extending perpendicularly from said discs, said horizontal drums lying parallel to the passage of the suspended fowl, while said rotary discs face towards the same passage, and a similar series of horizontal drums with a similar series of rotating discs alternately intervening between said horizontal drums near the bottom of said frame but with said lower rotating discs directed to the passage of the suspended fowl but angled upward so as to remove feathers from neck and wings of passing fowl, and a series of vertical drums near the top of said frame with rubber-like fingers extending radially from the surfaces of said vertical drums, and a series of rotating discs alternately intervening between said vertical drums with rubber-like fingers extending perpendicularly from said discs and said rotary discs directed to the passage of the suspended fowl but angled downward so as to remove feathers from the hocks and bottoms of the passing fowl.

4. A feather-picking machine as claimed in claim 3 in which the rotating discs are saucer-shaped and secured to a rotatable shaft, and the rubber-like fingers are fastened at right angles to the outer edge of said saucer-shaped discs.

5. A feather-picking machine as claimed in claim 3 in which the rotating discs are saucer-shaped and secured to a rotatable shaft, and rubber-like fingers approximately six inches long are fastened at right angles to the outer edge of said saucer-shaped discs.

6. A feather-picking machine as claimed in claim 3 in which the rotating discs are shaped like a pie-pan and secured to a rotatable shaft, and rubber-like fingers approximately six inches long are fastened perpendicularly to the inclined outer edge of said pie-pan shaped discs.

7. A feather-picking machine of the class described featuring alternate vertical drums and alternate rotary discs on both sides of a central passage for the fowl near the top of the machine, a series of horizontal drums midway between the top and bottom of said machine and disposed parallel to said central passage, a series of rotating discs alternately intervening between said horizontal drums, said alternate horizontal and rotating discs being oppositely disposed on both sides of said central passage, and a similar series of horizontal and rotating discs near the bottom of said machine and on both sides of said central passage, and all of said rotating discs comprising pie-pan shaped discs with rubber-like fingers secured perpendicularly to the inclined outer edge of said pie-pan shaped discs.

8. A feather picking machine designed to remove the feathers from all parts of a fowl that is hung by its feet and passes between a series of feather picking elements, said elements consisting of a series of vertical drums having rubber-like fingers extending radially from the surface of said drums and an alternate series of rotating discs having rubber-like fingers extending perpendicularly to the surfaces of said discs, which aforesaid feather picking elements are located near the top of said machine so as to pluck the feathers from around the legs and bottoms of the passing fowl, another series of rotating discs having rubber-like fingers extending at right angles to the surfaces of said discs and an alternate series of horizontal drums having rubber-like fingers extending radially from the surfaces of said drums, which aforesaid feather picking elements are located midway down from the top of said machine so as to pluck the feathers from off the bodies of the passing fowl, and another series of horizontal drums having rubber-like fingers extending radially from the surfaces of said drums and an alternate series of rotating discs having rubber-like fingers extending at right angles to the surfaces of said discs, which aforesaid feather picking elements are located near the bottom of said machine so as to pluck the feathers from around the neck and wings of the passing fowl.

9. A feather picking machine as claimed in claim 8 but having the first described rotating disc elements tilted downward so as to pluck feathers from the legs and bottoms of the passing fowl.

10. A feather picking machine as claimed in claim 8 but having the last described series of rotating disc elements tilted upward so as to pluck feathers from the necks and wings of the passing fowl.

11. A feather picking machine as claimed in claim 8 but having the second described series of rotating discs and the alternating horizontal drum elements laterally adjustable so as to be moved closer or removed farther from the bodies of the passing fowl and thus obtain effective contact by the plucking fingers.

12. A feather picking machine as claimed in claim 8 but having the first described feather picking elements arranged in a straight line while alternating the vertical drum elements with the rotating disc elements and mechanically moving all elements of the two parallel series near the top of the machine simultaneously.

13. A feather picking machine as claimed in claim 8 in which all of the rotating disc elements are shaped like a saucer and have rubber-like fingers extending at right angles to the lip area of said saucers.

14. A feather picking machine as claimed in claim 8 in which all the rotating disc elements are shaped like a pie-pan and have rubber-like fingers extending at right angles to the annular edges of said pie pans.

References Cited by the Examiner

UNITED STATES PATENTS

| | | | |
|---|---|---|---|
| 2,389,404 | 11/1945 | Barker | 17—11.1 |
| 2,444,556 | 7/1948 | Drews | 17—11.1 |
| 2,571,034 | 10/1951 | Harvey | 17—11.1 |
| 3,044,108 | 7/1962 | De Long | 17—11.1 |

FOREIGN PATENTS

| | | |
|---|---|---|
| 153,104 | 2/1963 | U.S.S.R. |

SAMUEL KOREN, *Primary Examiner.*

LUCIE H. LAUDENSLAGER, *Examiner.*